Dec. 4, 1923.

C. P. MARYE

THREADED STRUCTURE

Original Filed Feb. 1, 1919

1,476,455

Inventor:
Clifford P. Marye
By Foree Bain & Hinkle
Attys

Patented Dec. 4, 1923.

1,476,455

UNITED STATES PATENT OFFICE.

CLIFFORD P. MARYE, OF CHICAGO, ILLINOIS, ASSIGNOR TO MARYE SAFETY NUT CORPORATION, A CORPORATION OF ILLINOIS.

THREADED STRUCTURE.

Original application filed February 1, 1919, Serial No. 274,447. Divided and this application filed February 26, 1921. Serial No. 447,935.

*To all whom it may concern:*

Be it known that I, CLIFFORD P. MARYE, a citizen of the United States, residing at Chicago, in the county of Cook and State of Illinois, have invented certain new and useful Improvements in Threaded Structures, of which the following is a specification.

This invention relates to threaded structures.

It will be explained as applied to a self-locking nut.

One of the objects of the invention is to provide an improved self-locking threaded structure.

Another object is to provide a thread which will provide a locking action throughout its entire length.

Another object is to provide a thread wherein the locking action is evenly distributed throughout its active length.

Another object is to provide a self-locking threaded structure which will retain its locking properties after repeated application.

Another object is to provide a structure which will lessen the wear or distortion of both itself and the complementary threaded object with which it is used.

Another object is to provide a self-locking thread which may be produced by a milling operation.

Another object is to provide a structure wherein all of the thread convolutions are alike.

Another object is to provide an improved self-locking nut.

Other objects and advantages will hereinafter appear.

This application is a division of Serial No. 274,447, filed February 1, 1919. The former application relates particularly to and claims a method for producing nuts.

The ordinary standard thread is a continuous helix composed of parallel spiral convolutions of uniform inclination or uniform axial advance. In other words the helix angle of the thread is constant. The development of the pitch line of such a thread is a straight inclined line.

On the other hand the improved self-locking thread is a continuous helix composed of parallel spiral convolutions of continuously varying inclination or axial advance. In other words the helix angle of the self-locking thread is continuously varying and the convolutions are parallel. The development of the pitch line of this thread is a continuously undulating or sinuous inclined line. When such a thread is applied, for example, to a complementary standard thread the relative displacement produces a substantially uniformly distributed locking or gripping action.

The nut chosen for illustration resembles outwardly an ordinary undistorted nut of standard form. In order to facilitate its application to a bolt it may have a few of its first or entering convolutions within the bore of greater internal diameter than the rest of the convolutions.

The thread convolutions of the nut within the active or locking zone are alike and advance or progress in parallel spirals of continuously varying inclination. In other words the pitch line of the thread is a continuously undulating helix since the rate of axial advance is always changing.

When a nut provided with such an aberrant thread is turned upon a bolt having a complementary thread of standard form (a thread of uniform or true helical advance) the relative displacement of the bolt and nut threads will cause an abnormal frictional engagement or binding action therebetween. The thread of the nut will tend to force the standard thread of the bolt into an aberrant helix and the thread of the bolt will tend to force the thread of the nut into a true or uniformly advancing helix.

Since all of the active or locking convolutions of the nut thread deviate equally from a uniform spiral advance, the locking action is substantially evenly distributed throughout all of the convolutions in contact with the bolt thread. Consequently to provide a given locking effect, the action per convolution may be less than if the convolutions deviated unequally.

A slight deviation from a uniform advance will provide a nut by which sufficient transient and minute mutual distortion may be produced to lock the bolt and nut together. The extreme minuteness of the necessary distortion, resulting from the equal and gradual deviation of the aberrant thread, permits the nut to be removed and replaced a number of times without causing sufficient wear or permanent distortion of either the bolt or the nut thread to destroy the locking action.

An embodiment of the invention is illustrated in the accompanying drawing, wherein—

Figure 1:
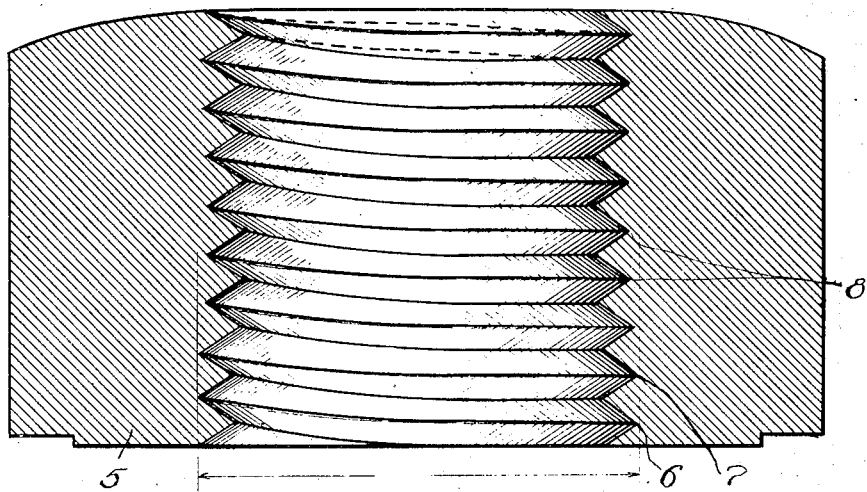
Fig. 1 is an enlarged diametrical section of a self locking nut embodying my invention.

The nut 5 is provided with a thread having two bolt-entrant convolutions 6 and 7, somewhat larger in diameter than the convolutions 8, but of the same pitch and character as the convolutions of the remaining portion of the thread spiral. The object of this is to permit the bolt to enter freely into the nut and into threaded relation with the nut orifice. The milling cutter 9, for cutting the thread in the nut, is provided with a series of teeth such as 10, 11 and 12, which will cut spirals of larger diameter than the teeth 13, 14 and 15, etc. The latter teeth are of the same diameter but differ in diameter from the teeth 10, 11 and 12. All of the teeth are, however, of the same separation or pitch and character. The series of teeth 10, 11 and 12 will cut the convolutions 6 and 7 of the nut, on the entrant side thereof, while the remaining teeth will cut the convolutions in the main body of the nut.

To produce the aberrant thread in the orifice or bore of the nut, the cutter is rotated at a relatively high velocity to give it good cutting effect and the nut is so presented to the cutter that the cutter will cut all of the thread convolutions in one side of the nut orifice at one and the same time. After the cutter has been set into rotation, at suitable velocity, the nut and the cutter are relatively moved with respect to each other in a direction at substantially right angles to their respective axes, so that the teeth of the cutter will cut into the nut a distance requisite for the depth of the thread. After this has been done the nut and the cutter are then relatively moved about their axes, and coincidently are axially moved with respect to each other to produce and define the spiral or pitch line of the thread convolutions. If the relative axial movement or helix angle is uniform or constant a standard nut having true spiraled convolutions would be produced. However, the locking nut is produced by continuously varying the relative axial movement or helix angle, so that the cutting operation does not progress or advance uniformly. The varying progress or advance of the nut blank relative to the cutter causes the cutter to produce a continuous thread whose convolutions form an aberrant helix.

Figure 3:
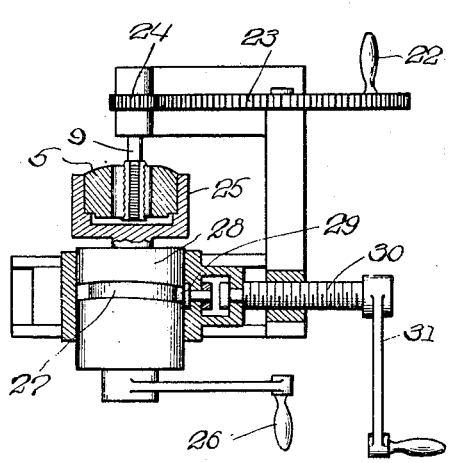
Fig. 3 is a diagrammatic view of a machine for making the nut.
Figure 2:
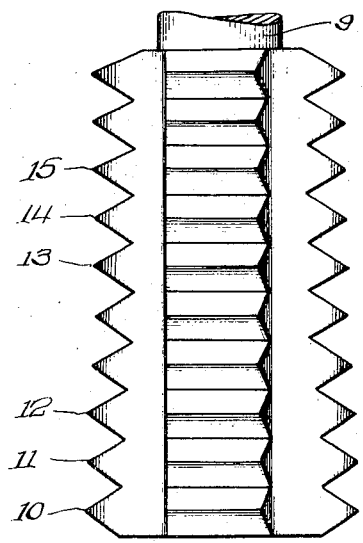
Fig. 2 is an elevation of a milling tool, such as may be used in producing the nut.

Machines of various kinds may be provided for producing the thread in the orifice or bore of a blank nut. Merely for the purpose of illustrating and explaining the method of procedure a hand operated machine is shown in Fig. 3.

The cutter is rotated by a handle 22 through a gear wheel 23 and a pinion 24. Pinion 24 is on a spindle or chuck which carries cutter 9.

The blank nut is held in a rotatable and axially and radially movable chuck 25. Chuck 25 is rotated by a handle 26.

The axial movement of the chuck is produced by the cooperation of a cam groove 27 in a cam 28 and a relatively stationary pin 29. The groove is cut into cam 28 as a helix of aberrant spiral configuration corresponding to the desired variation in the pitch line of the thread. In other words, the axial advance of cam groove 27 is not uniform through its length but changes. When the chuck is rotated by handle 26, the chuck is simultaneously advanced at a variable rate and thus the cutting of the thread in the bore of the nut advances axially at a varying rate producing the deviation in the spiral pitch line of the threads being cut therein.

The chuck is movable radially relative to the cutter by a screw 30 operated by a handle 31. This screw threads through a portion of the machine frame and in being turned advances or retracts the nut holding chuck radially. This adjustment is for the purpose of regulating the depth of the threads and for forcing the nut into cutting position relative to the cutter.

The continuous thread developed in the bore of the nut has all of its active or locking convolutions of the same size and shape and the separations or valleys therebetween are also of the same size and shape although the spiral thereof does not advance uniformly or regularly, but on the contrary advances in an irregular or non-uniform manner, all being irregular in the same relative position and to the same extent.

Having described my invention, what I claim as new and desire to secure by Letters Patent, is:—

1. A self-locking thread having parallel convolutions of continuously varying inclination and which constitute a continuous helix.

2. A self-locking thread in which parallel spiral convolutions form a continuous helix of continuously varying axial advance.

3. A self-locking threaded object having a continuous thread consisting of several convolutions of uniform separation and varying helix angle.

4. A lock nut having a continuous thread composed of several parallel spiral convolutions of continuously varying inclination.

5. A lock-nut having a bore with an enlarged diameter adjacent one end, and a continuous thread in the wall of the bore, said thread being composed of parallel spiral convolutions of continuously varying inclination.

In testimony whereof I hereunto set my hand.

CLIFFORD P. MARYE.